United States Patent [19]

Londrigan

[11] Patent Number: 4,753,967

[45] Date of Patent: Jun. 28, 1988

[54] POLYESTER POLYOLS MODIFIED BY POLYOLS HAVING 1 DEGREE AND 2 DEGREE OH GROUPS AND CELLULAR FOAMS THEREFROM

[75] Inventor: Michael E. Londrigan, Clearwater, Fla.

[73] Assignee: Sloss Industries Corporation, Birmingham, Ala.

[21] Appl. No.: 86,335

[22] Filed: Aug. 17, 1987

[51] Int. Cl.$^4$ ............................................. C08G 18/14
[52] U.S. Cl. ........................... 521/172; 252/182.24; 252/182.27; 252/182.28; 427/373; 427/385.5; 521/173; 521/48; 521/914; 524/590; 528/301; 560/91
[58] Field of Search ................. 521/172, 173, 48, 914; 252/182; 427/373, 385.5; 524/590; 528/301; 560/91

[56] References Cited

U.S. PATENT DOCUMENTS

| | | | |
|---|---|---|---|
| 3,502,601 | 3/1970 | Case et al. | 260/2.5 |
| 3,647,759 | 3/1972 | Walker | 260/75 R |
| 4,100,354 | 7/1978 | Owen, Jr. | 560/89 |
| 4,237,238 | 12/1980 | DeGuiseppi et al. | 521/131 |
| 4,246,365 | 1/1981 | Wiedermann et al. | 521/172 |
| 4,346,229 | 8/1982 | Derr et al. | 560/91 |
| 4,400,477 | 8/1983 | Blanpied | 521/112 |
| 4,411,949 | 10/1983 | Snider et al. | 428/304.4 |
| 4,439,549 | 3/1984 | Brennan | 521/131 |
| 4,444,915 | 4/1984 | Grube et al. | 521/131 |
| 4,444,918 | 4/1984 | Brennan | 521/131 |
| 4,444,920 | 4/1984 | Brennan | 521/173 |
| 4,469,821 | 9/1984 | Anderson | 521/131 |
| 4,469,824 | 9/1984 | Grigsby, Jr. et al. | 521/173 |
| 4,485,196 | 11/1984 | Speranza et al. | 521/172 |
| 4,506,090 | 3/1985 | Brennan et al. | 560/91 |
| 4,518,521 | 5/1985 | Heusch et al. | 252/188.31 |
| 4,526,908 | 7/1985 | Magnus et al. | 521/172 |
| 4,539,341 | 9/1985 | Hallmark et al. | 521/172 |
| 4,544,679 | 10/1985 | Tideswell et al. | 521/116 |
| 4,595,711 | 6/1986 | Wood | 521/158 |
| 4,604,410 | 8/1986 | Altenberg | 521/172 |

FOREIGN PATENT DOCUMENTS 0134661  3/1985  European Pat. Off.

OTHER PUBLICATIONS

J. A. Murphy and B. C. Wilbur, "A Comparison of Propylene Oxide vs. Ethylene Oxide-Based Aromatic Polyester Polyols; Performance Evaluation in Rigid Foam," SPI Meeting, 28th Annual Technical and Marketing Conference, San Antonio, Tex., Nov. 1984.

Bakalo et al., Chemical Abstracts, vol. 69, 1968, 105563p.

Schaatsma, Chemical Abstracts, vol. 78, 1973, p. 32, 44451n.

Knoblauch et al., Chemical Abstracts, vol. 83, 1975, 118478d.

Miroshnikov et al., Chemical Abstracts, vol. 89, 1978, 26735f.

Inoue et al., Chemical Abstracts, vol. 90, 1979, p. 663, 204442p.

Miroshnikov et al., Chemical Abstracts, vol. 90, 1979, p. 580, 22237t.

*Primary Examiner*—Maurice J. Welsh
*Attorney, Agent, or Firm*—James W. Grace; Charles W. Vanecek

[57] ABSTRACT

A polyester polyol suitable for use in a foam-forming reaction with an organic polyisocyanate in the manufacture of a polyurethane or polyisocyanurate foam, the polyester polyol being the reaction product of polycarboxylic acid and polyol components, wherein the polyol component solely or partially comprises an oxyalkylated polyol selected from the group consisting of (a) at least one oxyalkylated polyol having at least one primary and at least one secondary hydroxyl group, and (b) an oxyalkylated polyol mixture containing at least one oxyalkylated polyol having at least one primary and at least one secondary hydroxyl group.

20 Claims, No Drawings

POLYESTER POLYOLS MODIFIED BY POLYOLS HAVING 1 DEGREE AND 2 DEGREE OH GROUPS AND CELLULAR FOAMS THEREFROM

BACKGROUND OF THE INVENTION

1. Field of the Invention

This invention relates to the preparation of polyester polyols from polycarboxylic and polyol components utilizing at least one polyol having both primary and secondary hydroxyl groups for property enhancement. The polyols are useful in the preparation of cellular foam materials, particularly polyisocyanurate and polyurethane foams.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

Because of the relatively high cost of typical polyols useful in making cellular polymers and because an inexpensive source of polyols is now available through the use of waste or scrap materials containing phthalic acid residues, efforts have heretofore been directed to processes for converting these materials to commercially useful polyester polyols. One such process is described in U.S. Pat. No. 3,647,759 and concerns transesterifying dimethyl terephthalate (DMT) process residue with ethylene glycol to form polyol reactants for reaction with polyisocyanate material in the production of polyurethane foams. The transesterification products of DMT process residue with ethylene glycol are unfortunately normally solid or balsamic, have limited compatibility with Freon 11 (trichlorofluoromethane blowing agent) and cannot be used as the sole polyol in Freon-blown foam systems unless special measures are taken to enhance their compatibility, such as the co-use of various compatibilizing agents.

U.S. Pat. No. 4,237,238 describes improved polyisocyanurate foam characterized by a high degree of fire resistance with low smoke evolution on combustion and low foam friability. The foam is obtained by bringing together in the presence of a blowing agent and trimerization catalyst an organic polyisocyanate and a polyol mixture prepared by the transesterification, with a glycol of molecular weight from about 60 to about 400, of the DMT process residue described in U.S. Pat. No. 3,647,759. Polyol mixtures of this type are available commercially from Hercules, Inc., Wilmington, Del. under the trade name Terate ® Resins. Unfortunately, it has been determined that these commercially available polyester polyols of U.S. Pat. No. 4,237,238 which are derived by transesterifying the residue with excess diethylene glycol also have poor compatibility with the fluorocarbon blowing agents.

Further, U.S. Pat. No. 4,346,229 describes how liquid aromatic polyester polyols having excellent shelf stability and compatibility with trichlorofluoromethane can be produced by reacting DMT process residue with an excess of dipropylene glycol. However, various deficiencies have been encountered in producing and employing these polyester polyols. The reactions by which they're produced are undesirably long and give a by-product which reduces overall yield. The polyols also have an excessively high viscosity and their use in various foam formulations results in unduly extended reactivity profiles.

Thus, there still is a need in the art for a polyester polyol which does not have the aforementioned disadvantages.

OBJECTS OF THE INVENTION

It is accordingly an object of the present invention to provide a polyester polyol composition having a combination of advantageous properties, including a relatively fast reactivity in foam reactions, a desirably low viscosity, and good storage stability and compatibility with halohydrocarbon blowing agents, and a method of producing the polyol composition.

It is another object of the present invention to provide a compatibilizing polyol composition for use in the production of the improved polyester polyols of the invention.

It is still another object of the present invention to provide for use of the polyester polyol in producing polyisocyanurate and polyurethane foams having a combination of advantageous properties, including a reduced friability, high thermal resistance and compressive strength, and good dimensional stability.

It is a further object of the present invention to provide improved rigid cellular foams, especially polyisocyanurate and polyurethane foams, having a combination of advantageous properties, including a reduced friability, high thermal resistance and compressive strength, and good dimensional stability and insulation properties, and an improved method of producing the foams.

It is an additional object of the present invention to produce an improved rigid polyisocyanurate and an improved rigid polyurethane foam material, which are characterized by a high degree of fire resistance with low smoke evolution and flame spread on combustion, and the formation of a protective char over unburnt foam upon combustion.

It is a still further object of the present invention to provide closed cell polyisocyanurate and polyurethane foam materials which can be used in building panels which are highly insulating, thermally resistant, low in friability, soundproof and self-supporting.

DESCRIPTION OF THE INVENTION

The above objects have been achieved and the drawbacks of the prior art have been overcome by the development of an improved polyester polyol having enhanced halohydrocarbon solubility. The polyester polyol of the invention is prepared by reacting a polycarboxylic acid and/or acid derivative with a polyol component which consists solely or partially of at least one oxyalkylated polyol having at least one primary and at least one secondary hydroxyl group in the same molecule. This oxyalkylated polyol, which desirably is a liquid, suitably comprises at least about 10, preferably at least about 25, and more preferably at least about 30, weight percent of the polyol component utilized in preparing the polyester polyol. It is suitably formed by an oxyalkylation reaction wherein one or more alkylene oxides are reacted with an organic active hydrogen initiator(s), the alkylene oxide(s) and initiator(s) and amounts thereof being chosen so that, when these ingredients are reacted together, they form polyol molecules having both primary and secondary hydroxyl groups. The reaction typically yields the latter molecules as well as polyol molecules having only primary hydroxyl groups and others having only secondary hydroxyl groups. This mixed reaction product, which preferably is a liquid for ease of handling, is designated a compatibilizing polyol mixture of the invention and generally is used in toto in preparing the polyester polyols.

A sufficient amount of the compatibilizing polyol mixture is advantageously included in the mixture of polyols to be reacted with the acid component in preparing the polyester polyol of the invention to both increase the halohydrocarbon compatibility and reduce the viscosity of the resultant polyester polyol. The compatibilizing polyol mixture may be used as the sole polyol in producing the polyester polyol, and suitably comprises at least about 10, preferably at least about 50, and more preferably at least about 60, % by weight of polyol mixtures used in producing the polyester polyol.

The initiators useful in the preparation of the compatibilizing polyol mixtures are any of those compounds which are capable of initiating the polymerization of an alkylene oxide. In general, the organic active hydrogen initiators are compounds containing two or more hydroxy, amine, thiol or carboxyl groups or a mixture of one or more hydroxy and one or more amine, thiol or carboxyl group. Representative of such compounds are the mono- and di-saccharides such as sucrose; water; the polyhydric alkyl alcohols (wherein the term "polyhydric" refers to a compound containing two or more active hydrogen-containing groups) and halogenated polyhydric alkyl alcohols such a 2-methyl-propane-1,3-diol, trimethylol propane, trimethylol ethane, the glycols (e.g., ethylene glycol, 1,2-propylene glycol, 1,3-propylene glycol, 1,4-propylene glycol, 1,4-butylene glycol, 2,3-butylene glycol, 1,6-hexane diol, 1,8-octane diol), hydroxy, amino or thiol terminated polyalkylene polyethers such as the reaction products of ethylene glycol (e.g., diethylene glycol, triethylene glycol, tetraethylene glycol and higher polyethylene glycols); propylene glycol (e.g., dipropylene glycol and higher polypropylene glycols); butylene glycol (e.g., dibutylene glycol and higher polybutylene glycols); glycerol, pentaerythritol, 1,2,6-hexane triol, 1,2,4-butane triol, sorbitol; polyhydric cycloalkyl alcohols such as cyclohexane diol, and cyclohexane dimethanol (1,4-bishydroxymethylcyclohexane); the polyhydric aromatic alcohols and halogenated, polyhydric aromatic alcohols such as hydroquinone and other derivatives of phenol, e.g., 2,2-bis(4-hydroxy phenyl)propane commonly known as bisphenol A and its halogenated derivatives such as 2,2-bis(4-hydroxyl-3,5-dibromo phenyl), polyhydric alkyl amines such as the ethylene amines, ethanol amines and ammonia; polyhydric cycloalkyl amines such as isophorodiamine; polyhydric aromatic amines such as toluene diamine and other derivatives of aniline; phosphoric acid; Mannich condensation products; hydroxy-terminated polyacetals such as the reaction product of formaldehyde or other suitable aldehyde with a polyhydric alcohol or an alkylene oxide; polyhydric alkyl triols such as 1,2-ethanedithiol, 1,2-propanedithiol, 1,3-propanedithiol, polyhydric alkenyl thiols such as 2-butene-1,4-dithiol; polyhydric alkenyl thiols such as 3-hexyne-1,6-dithiol; and the like. Preferred of the organic active hydrogen initiators are glycols such as ethylene glycol and propylene glycol, and oxyalkylene glycols such as diethylene glycol and dipropylene glycol and higher oxyalkylene glycols.

The above initiators may be reacted with any suitable alkylene oxide such as ethylene oxide, propylene oxide, butylene oxide, amylene oxide, and mixtures of these oxides using techniques known to those skilled in the art. Highly suitable alkylene oxides have the formula

(A)

wherein R is hydrogen or lower alkyl of one to four carbon atoms, preferably lower alkyl of one or two carbon atoms. Essentially, such alkoxylations are carried out in the presence of a basic catalyst at a temperature sufficient to sustain the reaction. After completion of the reaction, the polyol mixture is neutralized and stripped of excess reactants.

The alkylene oxide/initiator reactants must be chosen to produce oxyalkylated initiators having both primary and secondary hydroxyl groups in the same molecule. For example, when initiators having only 1° OH groups are used, they may be suitably alkoxylated by alkylene oxides of the above formula (A) wherein R is an alkyl group, whereas those having only 2° OH groups can be reacted with ethylene oxide. Mixtures of the two types of alkylene oxides may be employed in either case. Either ethylene oxide or the higher alkylene oxides or mixtures thereof may be used to alkoxylate initiators having both 1° and 2° OH groups. The initiator preferably is reacted with just enough of an alkylene oxide such as propylene oxide or butylene oxide so that the final polyester polyol has both improved halohydrocarbon compatibility and a desirably low viscosity. The use of more alkylene oxide than needed adds to the expense of the process and can result in degradation in the properties of foams made from the polyester polyol. The equivalent ratio of alkylene oxide to active hydrogen-containing initiator is preferably about 0.2:1 to 1.5:1, more preferably about 0.5:1 to 1.2:1, and most preferably about 0.9:1 to 1.1:1.

In a preferred embodiment of the invention, the compatibilizing polyol mixture is a glycol mixture. An especially preferred compatibilizing polyol mixture is formed in a known manner by reacting a glycol containing 2 primary hydroxyl groups (e.g., ethylene glycol and/or diethylene glycol) with propylene oxide. The propoxylation advantageously is conducted by reaction of about 0.1 to 1.5 mole of propylene oxide per mole of the glycol containing 2 primary OH groups. According to the invention, it is preferred to use from about 0.5 to 1.2 mole and more preferably from about 0.9 to 1.1 mole, of propylene oxide to 1 mole of the primary hydroxyl group-containing glycol(s). The resultant compatibilizing glycol mixture then has a composition consisting of (a) about 5 to 70%, preferably about 8 to 50%, by weight, of 1° OH group-containing glycol,
(b) about 10 to 55%, preferably about 30 to 50%, by weight, of the monopropoxylated glycol,
(c) about 0 to 40%, preferably about 10 to 40%, by weight, of dipropoxylated glycol, and
(d) about 0 to 15%, preferably about 2 to 10%, by weight, of more highly propoxylated glycol (e.g., the glycol triether).

While the monopropoxylated polyol having both 1° and 2° OH groups can be distilled from the product, it has been found desirable to employ the total product in preparing the polyester polyols.

The polyester polyols useful in the invention can be prepared by known procedures from a polycarboxylic acid or acid derivative, such as an anhydride or ester of the polycarboxylic acid, and a mixture of polyols containing the compatibilizing polyol(s). Particularly suitable polyester polyols of the invention are aromatic polyester polyols containing phthalic acid residues.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis-glycol ester.

Besides the compatibilizing polyols, any suitable polyhydric alcohol may be used in preparing the polyester polyols. These additional polyols can be aliphatic, cycloaliphatic, aromatic and/or heterocyclic, and are preferably selected from the group consisting of diols, triols and tetrols. Aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Examples of especially suitable polyols for use in combination with the compatibilizing polyols are functionality-enhancing additives such as glycerol, pentaerythritol, α-methylglucoside, sucrose, sorbitol, trimethylolpropane and the like, and mixtures thereof.

The term "polyester polyol" as used in this specification and claims includes any minor amounts of unreacted polyol remaining after the preparation of the polyester polyol and/or unesterified polyol added after the preparation.

The polyester polyols of the invention advantageously contain at least 1.8 hydroxyl groups and generally have an average equivalent weight of from about 75 to 500. Preferably, the polyesters contain from about 1.8 to 8 hydroxyl groups and have an average equivalent weight of from about 100 to 300, more preferably from about 120 to 250. Highly desirable aromatic polyester polyols of the invention have an average functionality of about 1.8 to 5, preferably about 2 to 2.5. Polyesters whose acid component advantageously comprises at least about 30% by weight of phthalic acid residues are particularly useful. By phthalic acid residue is meant the group

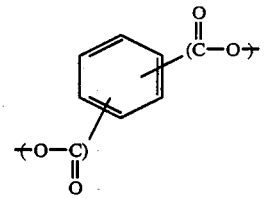

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic anhydride, (e) terephthalic acid, (f) residues from the manufacture of terephthalic acid, (g) isophthalic acid and (h) trimellitic anhydride. These compositions may be converted by reaction with the polyol mixtures of the invention to polyester polyols through conventional transesterification or esterification procedures.

While the polyester polyols can be prepared from substantially pure reactant materials, more complex ingredients are advantageously used, such as sidestream, waste or scrap residues from the manufacture of phthalic acid, terephthalic acid, dimethyl terephthalate, polyethylene terephthalate, adipic acid and the like. Suitable polyol side-stream sources include ethylene glycol, diethylene glycol, triethylene glycol and higher homologs or mixtures thereof. The similar homologous series of propylene glycols can also be used. Glycols can also be generated in situ during preparation of the polyester polyols of the invention by depolymerization of polyalkylene terephthalates. For example, polyethylene terephthalate yields ethylene glycol. Polyester polyols derived from raw materials containing compounds having the above defined phthalic acid residues constitute a preferred embodiment of the invention.

Preferred residues containing phthalic acid groups for reaction with the polyol mixture in accordance with the invention are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Dimethyl terephthalate may be present in amounts ranging from about 6 to 65% of the DMT process residue. Hercules, Inc., Wilmington Del., sells DMT process residues under the trademark Terate®101. Similar DMT process residues having a different composition but still containing the aromatic esters and acids are also sold by DuPont and others. The DMT process residues to be transesterified in accordance with the present invention preferably have a functionality at least slightly greater than 2.

One such suitable residue is the DMT residue disclosed in U.S. Pat. No. 3,647,759, the disclosure of which with respect to the residue is hereby incorporated by reference. This residue has been described as the residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. U.S. Pat. No. 3,647,759 describes in detail the residue set forth above and characterizes its properties.

Another suitable residue is disclosed in U.S. Pat. No. 4,411,949, the disclosure of which with respect to the residue is hereby incorporated by reference. This residue has been described as a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An especially useful by-product fraction from the manufacture of dimethyl terephthalate comprises a mixture of
(a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 35 percent by weight of polymeric materials, and
(g) about 1 to 4 percent by weight of ash.

Alternatively, the terephthalic acid residue may comprise the product remaining after the removal of terephthalic acid from the mixture obtained by the oxidation of p-xylene in the preparation of terephthalic acid. This residue contains carboxyl groups which can be esterified by the polyol mixture of the invention.

Still other preferred phthalic acid residues for use in preparing the polyester polyols of the invention are polyalkylene terephthalate, especially polyethylene terephthalate (PET), residues or scraps. These residues provide a dual advantage because they furnish a source of ethylene glycol in the reaction mixture and the desirable phthalic acid residues.

The digestion of waste or scrap residues, such as the DMT residues, PET scrap, etc., to form polyester polyols in accordance with the invention can be gainfully performed by using a polycarboxylic acid component-containing polyol mixture. The polyols of the digesting medium must include the compatibilizing polyols and can additionally include one or more of the other polyols mentioned above as suitable for producing the polyester polyols of the invention. The polycarboxylic acid component of the digesting medium can be a polycarboxylic acid or acid derivative, such as an anhydride or ester of the polycarboxylic acid. Polycarboxylic acid components which are not esters before the reaction will be converted to esters during it. Preferred polycarboxylic acid component-containing polyols for use with the compatibilizing polyols of the invention are described in U.S. Pat. Nos. 4,539,341 and 4,652,591, and U.S. patent application Ser. No. 034,970, filed Apr. 6, 1987, whose disclosures are hereby incorporated by reference.

In the preferred embodiment of the present invention involving the digestion of the waste or side-stream phthalic acid residues-containing materials (e.g., DMT process residues and/or PET scrap), the digestion is conveniently carried out under normal transesterification or esterification conditions well known and described in the prior art. Illustratively, the reaction can be conducted in the absence of a liquid reaction medium composed of material other than the transesterifying or esterifying ingredients, i.e., the compatibilizing polyol-containing polyol mixtures, and phthalic acid residues-containing material. The reaction suitably is performed under a flow of nitrogen and at atmospheric, subatmospheric or superatmospheric pressure and temperatures from about 150° C. to about 250° C. for a period from about one hour to about 24 hours. Reaction is considered to be substantially complete when the formation of distillate ceases. While reaction is taking place, distillate formed preferably is removed from the reaction vessel. The reaction can be carried out as a batch process or continuously.

The reaction is normally catalyzed. The waste or side-stream material itself may contain an effective amount of catalyst to promote the present reaction. However, if such a catalyst is not present or not enough of it is present, enough catalyst is added to the reaction mixture to suitably promote the reaction. Any conventional transesterification or esterification catalyst (single compound or mixture of compounds) can be used.

In one embodiment of the invention involving the use of the phthalic acid residues-containing material and polycarboxylic acid component-containing polyol, these ingredients and the catalyst are introduced together to the reactor and thereafter reacted. According to another embodiment of the invention, an acid component, such as phthalic anhydride, and the compatibilizing polyol-containing component are reacted first in the presence of the catalyst, such as tetraisopropyl titanate, to form a polyester polyol. Then the phthalic acid residues-containing material is added and the process is continued.

Although the resultant aromatic polyester polyol mixture of the invention can be employed without being filtered, it is often desirable to filter the mixture prior to its subsequent utilization, such as in foam preparations. Alternatively, the waste or side-stream material can be filtered before it is reacted. Metal salt removal is effected by the filtration.

The proportions of waste or side-stream material to polyols to optional acid or derivative thereof—when the above-described digesting polycarboxylic acid component-containing polyol is employed—may be varied to a considerable degree in accordance with the product desired. At all events, sufficient polyol and acid component should be employed to form a polyester polyol having a readily usable viscosity, such as below 50,000 cps at 25° C., and capable of efficiently polymerizing with organic polyisocyanates in the formation of rigid foams.

The saponification number (a measure of transesterification sites) of waste or side-stream materials, like the DMT process residue, should be considered in selecting reaction proportions. Similarly, the acid number is used in determining reaction proportions for the carboxyl functional residues of the invention. Suitable proportions of reactants in the transesterification or esterification may be as follows:

Equivalents ratio of total polyol component to total acid component [waste or side-stream material+any other acid component]=1.2:1 to 3.5:1, preferably 1.4:1 to 2.5:1.

The properties of the polyester polyol mixtures of the present invention fall within rather broad ranges. The viscosities (Brookfield) of the polyol mixtures measured in cps. at 25° C. fall within a rather broad range from about 500 to about 500,000, preferably about 500 to about 60,000, and most preferably about 2,000 to about 50,000; the hydroxyl number values fall within a range of from about 150 to about 950, preferably about 230 to about 650, and most preferably from about 260 to about 510; the acid number falls within a range of from about 0.2 to about 40 and preferably about 0.2 to about 10. The hydroxyl number can be defined by the equation:

$$OH = \frac{56.1 \times 1000 \times f}{M.W.}$$

wherein
OH=hydroxyl number of the polyol;
f=average functionality, that is average number of hydroxyl groups per molecule of polyol;
M.W.=average molecular weight of the polyol.

The transesterifying or esterifying polyol component is preferably employed in excess in the reaction so that at the end of the reaction there is an excess of transesterifying or esterifying polyol remaining in the polyol mixture of the invention. This residual polyol can vary broadly but advantageously falls within a range of from 5 to 35, preferably 8 to 25, percent by weight of the polyol mixture. Excess polyol can be distilled from the transesterified or esterified polyol mixture for appropriate adjustment of viscosity and equivalent weight. Advantageously, the distillation is conducted to yield a polyester polyol as above described, e.g., preferably having a viscosity of about 500 to 40,000 cps. and a hydroxyl number of about 230 to 650.

Most preferred polyester polyol mixtures of the invention employing compatibilizing glycols derived from the reaction of ethylene and/or diethylene glycol and propylene oxide as transesterifying or esterifying agent are characterized by a viscosity in cps. at 25° C. of about 2,000 to about 50,000, a free glycol content of from about 10 to about 22 percent by weight of said mixture, a hydroxyl number within a range of from about 275 to about 400, and an acid number of about 0.2 to about 10.

Although the polyol mixtures of this invention can be readily produced as fluid materials, particularly employing excess glycol transesterifying or esterifying agent and leaving residual glycol in the mixtures, additional diluents can be employed with the polyol mixtures. Inert diluents can be employed, but it is usually preferred to employ liquid polyols. Therefore, diols such as diethylene glycol or dipropylene glycol, or other suitable polyols may be added in a later step to beneficially modify the polyol mixtures, e.g., to reduce their viscosity.

For the purposes of viscosity reduction, these diluents are generally employed in only minor amounts, as, e.g., in the range of about 1 to 40 percent, preferably about 5 to 30 percent, by weight of the polyol mixture. However, it is also within the scope of the present invention to form polyol mixtures wherein the transesterifying or esterifying polyol and any subsequently added polyol are present in greater amounts. The content of transesterifying or esterifying and optionally added polyol in the mixture can be progressively increased to the point where they are the major component and the transesterified or esterified mixture of the invention is present in only minor amount, as, e.g., in the range of about 1 to 20 percent by weight of the transesterifying or esterifying and optionally added polyol.

Polyester polyols of the present invention made from the compatibilizing polyols are superior in fluorocarbon solubility to their diethylene glycol-based counterparts. The high fluorocarbon compatibility of polyester polyols of this invention makes them eminently suitable for inclusion in the B-component (premix) commonly used in the manufacture of cellular foam materials. It is possible to dissolve high levels of fluorocarbon in applicant's polyester polyols—e.g., 20 to 39 weight % fluorocarbon (wt. fluorocarbon/wt. fluorocarbon+wt. polyester polyol×100). The fluorocarbon-containing premixes also can include other conventional polyols of the type conventionally used in making rigid polyurethane or polyisocyanurate foam (e.g., a polyether polyol of functionality greater than 2), and other additives customarily used in foam production, such as catalysts, flame retardants, etc. Selection of the particular ingredients and proportions to use in these fluorocarbon-containing premixes are well within the knowledge of those skilled in the art.

The polyester polyols of the present invention may be used in the preparation of both cellular and non-cellular polymers. The latter polymers, such as the polyisocyanurates and polyurethanes, can be prepared by using standard techniques known to those skilled in the art. The polyester polyols are particularly useful in the preparation of polyisocyanurate foams and polyurethane foams. In an advantageous embodiment of the invention, the polyester polyols are employed in admixture with at least one other polyol in the production of these foams, especially the polyurethane foams. The polyisocyanurate and polyurethane foams can be prepared by mixing together the organic polyisocyanate with the polyol, catalyst and blowing agent at temperatures ranging from about 0° C. to 150 C.

The polyurethane foams can be prepared by reacting the polyester polyol of the invention and polyisocyanate on an essentially 1:1 to 1:1.25 equivalent basis. In the embodiment wherein the polyester polyols of the invention are combined with another polyol(s) to produce polyurethane foams, the polyester polyols of the invention can comprise about 5 to 100, preferably 5 to 75, and more preferably about 20 to 50, weight percent of the total polyol content in the foam preparations. The polyisocyanurate foams of the invention are prepared by reacting the polyisocyanate with a minor amount of polyol, such as sufficient polyol to provide about 0.10 to 0.70 hydroxyl equivalents of polyol per equivalent of said polyisocyanate, wherein the polyester polyol of the invention comprises about 5 to 100, and preferably about 50 to 100, weight percent of the total polyol content in the foam preparations.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4"-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

The preferred polymethylene polyphenylisocyanates desirably have a funtionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

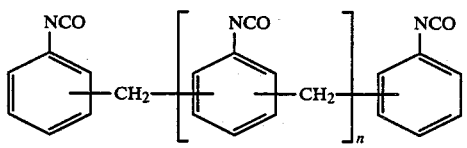

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight precent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6-21. It should, therefore, be understood that the polymethylene polyphenylisocyanates available on the market under the trade names of CODE 047 or PAPI-20 (Upjohn) and MR 200 (Mobay) can successfully be employed within the spirit and scope of the present invention.

In order to ensure complete reaction of isocyanurate foams, the polymethylene polyphenylisocyanate and the polyol are generally mixed in an equivalent ratio of 1.5:1 to 6:1 and preferably 2:1 to 5:1. In ranges outside these proportions the reaction tends to yield a product having less desirable physical characteristics.

The polyols which can be employed in combination with the polyester polyols of the invention in the preparation of the polyurethane and polyisocyanurate foam compositions include monomeric polyols and polyether polyols in general, including the above-described compatibilizing polyols. The polyether polyols are found particularly useful in preparing rigid polyurethane foams. The polyfunctional active hydrogen initiators used in producing the polyether polyols preferably have a functionality of 2-8, and more preferably have a funtionality of 3 or greater (e.g., 4-8).

Any blowing agent (e.g., water) typically employed in similar prior art foam products containing polyisocyanurate and/or polyurethane linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons.

The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the total foam-forming composition. When the blowing agent has a boiling point at or below ambient, it is maintained under pressure until mixed with the other components. Alternatively, it can be maintained at subambient temperatures until mixed with the other components.

A particularly advantageous feature of this invention is that halogenated organic, especially fluorocarbon, blowing agents are highly compatible with applicant's aromatic polyester polyols. Compatibility between the polyol and fluorocarbon blowing agent components employed in manufacturing rigid polyisocyanurate and polyurethane foam is sufficiently high that with normal production techniques as much as about 40 to 95 weight % of the polyol may be aromatic polyester polyol. This allows full advantage to be taken of the tendency of the aromatic polyester polyol to produce rigid foams of low friability, k-factor, flammability and cost.

The fluorocarbon blowing agent can be any of the fluorocarbons known to those skilled in the art as useful for blowing polymer mixtures into foams. In general, these blowing agents have an atmospheric pressure boiling point between minus 50° and 100° C. and preferably between zero and 50° C. Such blowing agents can be, if desired, substituted by chlorine and/or bromine in addition to the fluorine content. A preferred class of fluorocarbons are the fluorinated alkanes. Examples of fluorocarbon blowing agents are trichlorofluoromethane, monochlorodifluoromethane, dichlorodifluoromethane, dichloromonofluoromethane, $CCl_2FCClF_2$ and $CCl_2FCF_3$. Mixtures of fluorocarbon blowing agents can be employed. Trichlorofluoromethane is a preferred blowing agent.

The particular halohydrocarbon and polyols and percentages of each to be employed in any specific polyol blend of the invention for maximum miscibility can be easily determined by one skilled in the art by a process or trial and error. In accordance with the present invention, there may be obtained miscible blends comprising from at least about 10, preferably 25, percent by weight to about 50, preferably 35, percent by weight of halohydrocarbon blowing agent and correspondingly from about 90, preferably 75, percent by weight to about 50, preferably 65, percent by weight of polyol components.

Any suitable surfactant can be employed in the foams of this invention. The surfactant may be included in the polyol/halohydrocarbon blend. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with a reactive hydrogen-containing compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1-3-butanediamine, N,N-dimethylethanolamine, N,N-diethylethanolamine, and the like. In a preferred embodiment of the invention, the polyol/halohydrocarbon blend additionally includes the catalyst(s). The catalysts generally comprise from about 0.1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 10 to 30 seconds and firm times of 25 to 80 seconds. One preferred type of catalyst is a mixture of a tertiary amino phenol, such as 2,4,6-tris(dimethylaminomethyl)phenol (sold by Rohm and Haas Co. under the designation "DMP-30"), and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,179, filed May 8, 1972, now U.S. Pat. No. 3,799,896.

Other additives may also be included in the foam formulations. Included are nonreactive and reactive flame retardants, such as tris(2-chloroethyl)-phosphate, dispersing agents, plasticizers, fillers and pigments. Minor amounts (typically less than about 15 wt. %) of these additives can be included in the polyol/halohydrocarbon blend of the invention.

The present invention also provides a process for producing a laminate which comprises (a) contacting at least one facing sheet with a foam-forming mixture comprising an organic polyisocyanate, a blowing agent, a catalyst and the polyol composition, and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example illustrates the preparation of a polyether polyol mixture of the present invention.

62 g of ethylene glycol (1.0 mole) and 0.24 g of KOH were charged to a reaction vessel which was then purged with nitrogen. The moisture in the reactor was stripped to 0.05%. 58 g (1.0 mole) of propylene oxide were then introduced to the reactor and the reaction was run under a pressure of about 40 psi and at a temperature of from 120° to 130° C. At the end of the reaction, excess propylene oxide was stripped off and the reaction mixture was adjusted to a neutral pH using acetic acid.

The resulting product (Polyether Polyol No. 1) had a hydroxyl number of 872, an equivalent weight of 64 and a composition by GLC analysis of:

12.9% of ethylene glycol,
42.2% of monopropoxylation product of ethylene glycol,
36.7% of dipropoxylation product of ethylene glycol, and
9.3% of tripropoxylation product of ethylene glycol.

EXAMPLE 2

This example illustrates the preparation of additional polyether polyol mixtures of the present invention from ethylene glycol (EG) and propylene oxide (PO).

Each polyol mixture was prepared generally according to the procedure of Example 1 utilizing the ratio of reactants presented in Table I below. The hydroxyl number, equivalent weight and composition of each polyol mixture produced are listed in the table.

TABLE I

| POLYETHER POLYOL MIXTURES | | | | |
|---|---|---|---|---|
| NUMBER | 2 | 3 | 4 | 5 |
| Moles PO/Mole EG | 1.0 | 1.0 | 1.0 | 0.5 |
| Hydroxyl No. | 872 | 902 | 892 | 1224 |
| Equivalent Wt. | 64 | 62.5 | 62.9 | 45.8 |
| EG (%)[1] | 11.7 | 15.3 | 14.3 | 41.5 |
| POEG (%)[2] | 46.4 | 34.5 | 44.5 | 44.1 |
| POEGPO (%)[3] | 36.8 | 27.2 | 37.3 | 12.7 |
| POEGPOPO (%)[4] | 5.1 | Not measured | Not measured | Not measured |

[1] EG = $HOCH_2CH_2OH$

[2] POEG = 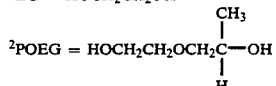

[3] POEGPO = 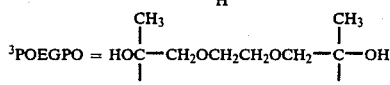

[4] POEGPOPO = 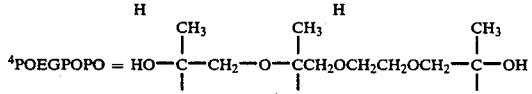

EXAMPLE 3

This example illustrates the preparation from diethylene glycol (DEG) and propylene oxide (PO) of additional polyether polyol mixtures of the present invention.

Each polyol mixture was prepared generally according to the procedure of Example 1 utilizing diethylene glycol in place of ethylene glycol and the ratio of reactants presented in Table II below. The hydroxyl number, equivalent weight and composition of each polyol mixture produced are listed in the table.

TABLE II

| POLYETHER POLYOL MIXTURES | | | | |
|---|---|---|---|---|
| NUMBER | 6 | 7 | 8 | 9 |
| Moles PO/Mole DEG | 1.0 | 1.0 | 1.0 | 0.5 |
| Hydroxyl No. | 653 | 636 | 676 | 829 |
| Equivalent Wt. | 86 | 88 | 83.0 | 67.7 |
| DEG (%)[1] | 10.5 | 11.1 | 15.9 | 42.8 |
| PODEG (%)[2] | 50.3 | 41.8 | 50.3 | 44.1 |
| PODEGPO (%)[3] | 32.6 | 28.5 | 30.6 | 9.6 |
| PODEGPOPO (%)[4] | 6.6 | Not Measured | Not Measured | Not Measured |

[1] DEG = $HOCH_2CH_2OCH_2CH_2OH$

[2] PODEG = $HOCH_2CH_2OCH_2CH_2OCH_2-\underset{\underset{H}{|}}{\overset{\overset{CH_3}{|}}{C}}-OH$

[3] PODEGPO = $HO-\underset{\underset{H}{|}}{\overset{\overset{CH_3}{|}}{C}}-CH_2OCH_2CH_2OCH_2CH_2OCH_2-\underset{\underset{H}{|}}{\overset{\overset{CH_3}{|}}{C}}-OH$

[4] PODEGPOPO =
$HO-\underset{\underset{H}{|}}{\overset{\overset{CH_3}{|}}{C}}-CH_2O-\underset{\underset{H}{|}}{\overset{\overset{CH_3}{|}}{C}}-CH_2OCH_2CH_2OCH_2CH_2OCH_2-\underset{\underset{H}{|}}{\overset{\overset{CH_3}{|}}{C}}-OH$

EXAMPLE 4

This example illustrates the preparation of aromatic polyester polyols by transesterifying DMT process residues with (a) a polyether polyol mixture of the invention and (b) three comparative polyols.

The preparation of inventive Polyol No. 1 and comparative Polyols A–C of Table III below was initiated by placing the listed quantities of the ingredients in a resin kettle equipped with a stirrer, thermometer and distillation head. The ingredients then were brought to 225° C. and held at this temperature for 2 hours in the case of Polyol No. 1, Polyols A and B, and 3 hours in the case of Polyol C. During this time, methanol and water were distilled from the reaction mixture. Properties of the aromatic polyester polyols produced are shown in Table III. The results indicate that the polyester polyol of the invention has a low viscosity and excellent fluorocarbon compatibility.

TABLE III

| TRANSESTERIFIED POLYOL MIXTURES | | | | |
|---|---|---|---|---|
| | POLYESTER POLYOL | | | |
| | No. 1 | A | B | C |
| Charge | | | | |
| DMT Process Residue | I[3] | I[3] | I[3] | II[4] |
| DMT Process Residue (g) | 400 | 461 | 400 | 282 |
| Polyether Polyol No. 1[1] (g) | 437 | — | — | — |
| Diethylene Glycol (g) | — | 365 | — | — |
| Dipropylene Glycol (g) | — | — | 462 | — |
| M103[2] | — | — | — | 547 |
| Phthalic Anhydride | — | — | — | 121 |
| Catalyst | Mn(OAc)$_2$.4H$_2$O | Mn(OAc)$_2$.4H$_2$O | TPT[5] | TPT[5] |
| Catalyst Amount | 2 g | 2 g | 1 ml | 1 ml |
| Properties | | | | |
| Brookfield Viscosity at 25° C. (cps) | 19,600 | 44,800 | 49,800 | 20,600 |
| Hydroxyl No. | 277 | 276 | 271 | 272 |
| Equivalent Wt. | 203 | 203 | 207 | 206 |
| Solubility of R-11B (%) | ≧30 | 15 | ≧50 | ≧30 |

[1] Of Example 1.
[2] M103 = Mixture of approximately 85% dipropylene glycol and 15% tripropylene glycol (Arco Chemical Co.).
[3] Residue I has an acid number of 64.4, saponification number of 484.5 and DMT content of 11.9%.
[4] Residue II = Terate 101 having an acid number of 23.8 and saponification number of 535 (Hercules, Inc.)
[5] TPT = Tetraisopropyltitanate.

EXAMPLE 5

This example illustrates the preparation of additional aromatic polyester polyols of the invention by transesterifying DMT process residues with further polyether polyol mixtures prepared from ethylene glycol and propylene oxide.

have extremely low viscosities and excellent fluorocarbon compatibility.

TABLE V

| | TRANSESTERIFIED POLYOL MIXTURES | | | | | | | | |
|---|---|---|---|---|---|---|---|---|---|
| | POLYESTER POLYOL NO. | | | | | | | | |
| | 10 | 11 | 12 | 13 | 14 | 15 | 16 | 17 | 18 |
| Charge | | | | | | | | | |
| DMT Process Residue | Residue I[2] | Residue II[2] | Residue II[2] | Residue I[2] | Residue I[2] | Residue I[2] | Residue I[2] | Residue I[2] | Residue II[2] |
| DMT Process Residue (g) | 300 | 350 | 350 | 375 | 350 | 350 | 400 | 400 | 28.6[3] |
| Polyether Polyol No. | 6[4] | 7[4] | 7[4] | 7[4] | 8[4] | 8[4] | 9[4] | 9[4] | 7[4] |
| Polyether Polyol (g) | 468 | 545 | 500 | 535 | 545 | 500 | 470 | 446 | 44.5[3] |
| Catalyst[1] | Mn | TPT | TPT | TPT | TPT | TPT | TPT | TPT | TPT |
| Catalyst (g) | 2 | 1 | 1 | 1 | 1 | 1 | 1 | 1 | 35 |
| Reaction Conditions | | | | | | | | | |
| Reaction Temp. (°C.) | 225 | 225 | 225 | 225 | 225 | 225 | 225 | 225 | 225 |
| Reaction Time (Hrs) | 3 | 2 | 2 | 2 | 2 | 2 | 2 | 2 | 3 |
| Properties | | | | | | | | | |
| Brookfield Viscosity (cps) | 4080 | 4100 | 6600 | 5500 | 3040 | 4900 | 6900 | 9500 | 3800 |
| Hydroxyl No. | 257 | 265 | 248 | 233 | 276 | 255 | 287 | 273 | 274 |
| Equivalent Wt. | 219 | 212 | 226 | 241 | 203 | 220 | 195 | 205 | 205 |
| Solubility of R-11B (%) | ≧30 | | | | ≧30 | ≧30 | 23.4 | 22.6 | ≧30 |

[1]Mn = Mn(OAC)$_2$.4H$_2$O; TPT = Tetraisopropyltitanate.
[2]Of Example 4.
[3]Amount is in pounds.
[4]Of Example 3.

The polyols of Table IV below were prepared generally in accordance with the procedure of Example 4 by reacting the listed quantities of the ingredients under the reaction conditions presented in the table. Characteristics of the aromatic polyester polyols produced are shown in Table IV. The results indicate that the polyester polyols of the invention have a low viscosity and generally excellent fluorocarbon compatibility.

EXAMPLE 7

This example illustrates the synthesis of polyurethane foams utilizing two aromatic polyester polyols of the invention and two comparative aromatic polyester polyols.

In the foam syntheses, the following quantities of the following ingredients were combined as indicated:

TABLE IV

| | TRANSESTERIFIED POLYOL MIXTURES | | | | | | | |
|---|---|---|---|---|---|---|---|---|
| | POLYESTER POLYOL NO. | | | | | | | |
| | 2 | 3 | 4 | 5 | 6 | 7 | 8 | 9[1] |
| Charge | | | | | | | | |
| DMT Process Residue | Residue II[3] | Residue II[3] | Residue I[3] | Residue I[3] | Residue I[3] | Residue I[3] | Residue II[3] | Residue I[3] |
| DMT Process Residue (g) | 400 | 400 | 420 | 400 | 400 | 500 | 35.4[4] | 320 |
| Polyether Polyol No. | 3[5] | 3[5] | 3[5] | 4[5] | 4[5] | 5[5] | 3[5] | 1[6] |
| Polyether Polyol (g) | 437 | 415 | 426 | 437 | 415 | 395.5 | 36.7[4] | 618 |
| Catalyst[2] | Mn | Mn | TPT | Mn | Mn | Mn | Mn | Mn |
| Catalyst (g) | 2 | 2 | 1 | 2 | 2 | 2 | 81 | 2 |
| Reaction Conditions | | | | | | | | |
| Reaction Temp. (°C.) | 225 | 225 | 225 | 225 | 225 | 225 | 225 | 225 |
| Reaction Time (Hrs) | 2 | 2 | 2 | 2 | 2 | 2 | 3 | 2 |
| Properties | | | | | | | | |
| Brookfield Viscosity (cps) | 16,600 | 40,800 | 44,000 | 21,700 | 27,800 | 64,200 | 46,800 | 10,600 |
| Hydroxyl No. | 323 | 281 | 267 | 288 | 282 | 343 | 290 | 294 |
| Equivalent Wt. | 174 | 200 | 210 | 195 | 199 | 163 | 195 | 191 |
| Solubility of R-11B (%) | | | | ≧30 | ≧30 | 17.5 | ≧30 | ≧30 |

[1]Polyester Polyol No. 9 was stripped of excess glycol on a flash evaporator.
[2]Mn = Mn(OAC)$_2$.H$_2$O; TPT = Tetraisopropyltitanate.
[3]Of Example 4.
[4]Amount is in pounds.
[5]Of Example 2.
[6]Of Example 1.

EXAMPLE 6

This example illustrates the preparation of additional aromatic polyester polyols of the invention by transesterifying DMT process residues with polyether polyol mixtures prepared from diethylene glycol and propylene oxide.

The polyols of Table V below were prepared generally in accordance with the procedure of Example 4 by reacting the listed quantities of the ingredients under the listed conditions. Characteristics of the aromatic polyester polyols produced are shown in Table V. The results indicate that the polyester polyols of the invention

| Item | Ingredient | Quantity (pbw) |
|---|---|---|
| A | Sucrose amine polyol[1] | 42.25 |
| B | Polyether polyol[2] | 32.45 |
| C | Diethyl bis(2-hydroxyethyl) aminomethyl phosphonate[3] | 15.00 |
| D | Aromatic polyester polyol [See Table VI] | 51.80 |
| E | Silicone surfactant[4] | 3.5 |
| F | N,N—dimethylcyclohexylamine[5] | 0.26 |
| G | R-11B | 55.0 |
| H | Polymethylene polyphenyl isocyanate[6] | wt. to |

-continued

| Item | Ingredient | Quantity (pbw) |
|------|-----------|----------------|
|      |           | provide 115 index |

[1] Item A is that supplied by Olin Corporation under the trade name Poly G71-530.
[2] Item B is that supplied by Dow Chemical Company under the trade name Voranol RA-800.
[3] Item C is a flame retardant supplied by Stauffer Chemical Corporation under the trade name Fyrol 6.
[4] Item E is that supplied by Dow Corning Corporation under the trade name DC-193.
[5] Item F is an amine catalyst supplied by Air Products and Chemicals, Inc. under the trade name Polycat 8.
[6] Item H is a polymethylene polyphenyl isocyanate having a viscosity of 150–250 centipoises at 25° C. and is available from Mobay Chemical Corporation under the trade name Mondur MR.

In each foam preparation, a premix of Items A, B, C, D and G at 15° C. was poured into a reaction vessel. Items E and F at ambient temperature were then added to the vessel, and all ingredients were mixed at 1000 rpm for ca. 10 seconds. Lastly, Item H at ambient temperature was added to the vessel and all ingredients were mixed at 3500 rpm for 15 seconds, and thereafter poured into a box to yield a rigid polyurethane foam.

Characteristics of the foams produced are shown in the following Table VI.

The gel time results presented in Table VI demonstrate that Polyol Nos. 1 and 18 of the invention have an enhanced reactivity in comparison to comparative Polyol C. The foams made from the four polyols have comparable k-factor, oxygen index and dimensional stability values.

TABLE VI
EVALUATION OF POLYOLS IN POLYURETHANE FOAMS

|  | FOAM |  |  |  |
|---|---|---|---|---|
|  | A | B | C | D |
| Polyester Polyol Utilized | Polyol No. 1[4] | Polyol No. 18[5] | Polyol A[4] | Polyol C[4] |
| Cream Time (sec) | 23 | 28 | 22 | 25 |
| Gel Time (sec) | 67 | 62 | 58 | 77 |
| Firm Time (sec) | 80 | 94 | 66 | 94 |
| Tack Free Time (sec) | 110 | 125 | 95 | 120 |
| Density (pcf) | 1.91 | 2.06 | 1.74 | 1.89 |
| k-Factor[1] after 1 day | .134 | .132 | .135 | .134 |
| after 30 days | .151 | .148 | .150 | .155 |
| Oxygen Index[2] | 23.75 | 23.75 | 23.75 | 23.75 |
| %Δ V max,[3] | 17 | 31 | 21 | 24 |
| 28 days at 70° C./95% R.H. |  |  |  |  |
| 28 days at 110° C. | 31 | 36 | 34 | 39 |

[1] Units = Btu-in/hr-ft²-°F.
[2] Flammability test conducted according to ASTM D-2863-70, except that a sample measuring ¼″ × ¼″ × 6″ was used.
[3] According to ASTM Test Method D-2126.
[4] Of Example 4.
[5] Of Example 6.

EXAMPLE 8

This example illustrates the synthesis of polyisocyanurate foams (14% trimer) utilizing an aromatic polyester polyol of the invention and two comparative aromatic polyester polyols.

In each foam synthesis, the following quantities of the following ingredients were combined as indicated;

| Item | Ingredient | Quantity (pbw) |
|------|-----------|----------------|
| A | Polymethylene polyphenylisocyanate[1] | 202 |
| B | R-11B | 55 |
| C | Silicone surfactant[2] | 2.5 |
| D | Aromatic polyester polyol (See Table VII) |  |
| E | Catalyst[3] (See Table VII) |  |

[1] Isocyanate having an equivalent weight of 138, an acidity of 0.03% HCl, and a viscosity of 2000 cps at 25° C.
[2] Surfactant = Y-10222 (Union Carbide Corp.).
[3] Catalyst = Blend of DMP-30:potassium-2-ethyl hexoate:diethylene glycol in a 1:4.2:7.8 weight ratio.

A mixture of Items A and B, at a temperature of 15° C., was poured into a reaction vessel. Items C and D were then added to the vessel, and all ingredients were mixed at 3600 rpm for 5 seconds. Item E was then mixed into the contents of the vessel over a 5 second interval. All ingredients were thereafter mixed at 3600 rpm for an additional 7 seconds and then poured into a box, yielding a polyisocyanurate foam.

Characteristics of the foams produced (Foams A–C) are shown in the following Table VII.

The results presented in Table VII demonstrate that inventive Polyol No. 1 contributes to enhanced reactivity in comparison to comparative Polyol C since the reactivity profiles of Foams A and C are comparable despite the use of 27% less catalyst in the production of Foam A. All the other properties of Foams A–C are comparable except that Foams A and C are lower in oxygen index than Foam B.

TABLE VII
EVALUATION OF POLYOLS IN POLYISOCYANURATE FOAMS

|  | FOAM |  |  |
|---|---|---|---|
|  | A | B | C |
| Polyester Polyol Utilized | Polyol No. 1[5] | Polyol | Polyol |
| Polyester Polyol (pbw) | 96.5 | 98 | 98 |
| Catalyst (pbw) | 8 | 11.8 | 10.9 |
| Cream Time (sec) | 19 | 14 | 20 |
| Gel Time (sec) | 45 | 27 | 44 |
| Firm Time (sec) | 56 | 35 | 56 |
| Tack Free Time (sec) | 86 | 42 | 71 |
| Density (pcf) | 1.70 | 1.62 | 1.64 |
| k-Factor[1] after 1 day | .140 | .135 | .135 |
| after 30 days | .159 | .148 | .160 |
| Friability[2] (% wt loss) | 21.4 | — | 21.1 |
| Oxygen Index[3] | 23.25 | 25.25 | 22.75 |
| %Δ V max[4], |  |  |  |
| 28 days at 70° C./95% R.H. | 11 | 15 | 13 |
| 28 days at 110° C. | 10 | 14 | 10 |

[1] Units = Btu-in/hr-ft²-°F.
[2] According to ASTM Test Method C-421.
[3] Flammability test conducted according to ASTM D-2863-70, except that a sample measuring ¼″ × ¼″ × 6″ was used.
[4] According to ASTM Test Method D-2126.
[5] Of Example 4.

EXAMPLE 9

This example illustrates the preparation of aromatic polyester polyols of the invention by reacting a DMT process residue with a combinaton of α-methylglucoside, phthalic anhydride, and a polyether polyol mixture prepared from ethylene glycol and propylene oxide.

The preparation of Polyols Nos. 19 and 20 of Table VIII below was initiated by placing all the listed ingredients except the DMT process residue in a resin kettle equipped with a stirrer, thermometer and distillation head. The ingredients then were brought to 230° C. and held at this temperature for 1 hour. During this time, water of esterificaton was distilled from the reaction mixture. The listed quantity of DMT process residue then was added and the temperature was brought to 225° C. and held for 2 hours at this temperature. During this period, methanol and some water were distilled from the reaction mixture. After 2 hours at 225° C., distillation ceased and the product was cooled to ambient temperature.

Characteristics of the aromatic polyester polyols produced are shown in Table VIII.

TABLE VIII

TRANSESTERIFIED POLYOL MIXTURES

| | POLYESTER POLYOL NO. | |
|---|---|---|
| | 19 | 20 |
| Charge | | |
| DMT Process Residue I[1] (g) | 360 | 360 |
| Polyether Polyol No. 1[2] (g) | 457 | 457 |
| α-Methyl glucoside (g) | 40 | 30 |
| Borax (g) | 2 | 2 |
| TPT[3] (ml) | 1 | 1 |
| Phthalic Anhydride (g) | 40 | 40 |
| Reaction Conditions | | |
| Reaction Temp. (°C.) | 230/225 | 230/225 |
| Reaction Time (Hr) | ½ | ½ |
| Properties | | |
| Brookfield Viscosity (cps) | 41,400 | 41,200 |
| Hydroxyl Number | 289 | 271 |
| Equivalent Wt. | 194 | 207 |

[1]Of Example 4.
[2]Of Example 1.
[3]TPT = tetraisopropyltitanate.

EXAMPLE 10

This example illustrates the preparation of aromatic polyester polyols of the invention by reacting a DMT process residue with combinations of (a) a polyether polyol mixture prepared from diethylene glycol and propylene oxide and (b) a polyol or acid co-reactant.

Polyester Polyol Nos. 21 to 27 of Table IX below were prepared generally in accordance with the procedure of Example 4 by charging the listed quantities of the ingredients to the resin kettle and reacting them under the conditions presented in the table. In the preparation of Polyester Polyol No. 28, α-methylglucoside was added after the other ingredients had reacted together for 2 hrs at 225° C., and then the reaction mixture was stirred for an additional hour at 200° C. Characteristics of the aromatic polyester polyols produced are shown in Table IX.

TABLE IX

TRANSESTERIFIED POLYOL MIXTURES

| | POLYESTER POLYOL NO. | | | | | | | |
|---|---|---|---|---|---|---|---|---|
| | 21 | 22 | 23 | 24 | 25 | 26 | 27 | 28 |
| DMT Process Residue II[1] (g) | 480 | 480 | 400 | 400 | 400 | 400 | 262 | 375 |
| Polyether Polyol No. 7[2] (g) | 211 | 430 | 500 | 550 | 550 | 500 | 580 | 535 |
| Propylene Glycol (g) | 209 | — | — | — | — | — | — | — |
| Pentaerythritol (g) | — | 101 | — | — | — | — | — | — |
| α-Methylglucoside (g) | — | — | 50 | 50 | 100 | 100 | — | 60[4] |
| Maleic Anhydride (g) | — | — | — | — | — | — | 65 | — |
| TPT[3] (ml) | 1 | 1 | 1 | 1 | 1 | 1 | 1 | 1 |
| Reaction Conditions | | | | | | | | |
| Reaction Temp. (°C.) | 225 | 225 | 225 | 225 | 225 | 225 | 225 | 225 |
| Reaction Time (Hrs.) | 2 | 3.5 | 3.5 | 3.5 | 3.5 | 3.5 | 2 | 2 |
| Properties | | | | | | | | |
| Brookfield Viscosity (cps) | 96,000 | 58,400 | 16,000 | 12,600 | 14,900 | 27,600 | 3,400 | 10,000 |
| Hydroxyl No. | 294 | 289 | 240 | 253 | 288 | 268 | 237 | 287 |
| Equivalent Wt. | 191 | 194 | 234 | 222 | 195 | 209 | 237 | 196 |

[1]Of Example 4.
[2]Of Example 3.
[3]TPT = Tetraisopropyltitanate.
[4]Added after initial 2-hr reaction, then reaction mixture was stirred at 200° for 1 hour.

EXAMPLE 11

This example illustrates the synthesis of polyurethane foams utilizing aromatic polyester polyols of Examples 9 and 10.

The foam syntheses were conducted according to the procedure of Example 7 utilizing the ingredients and quantities thereof presented in Example 7 except that the inventive aromatic polyester polyols employed were those listed in Table X below. Various characteristics of the polyurethane foams produced (Foams A–F) are shown in the table. The results indicate that foam dimensional stability can be improved by increasing the proportion of a functionally-enhancing co-reactant such as α-methylglucoside in the transesterifying agent used in preparing the polyester polyols.

TABLE X

EVALUATION OF POLYOLS IN POLYURETHANE FOAMS

| | FOAM | | | | | |
|---|---|---|---|---|---|---|
| | A | B | C | D | E | F |
| Polyester Polyol Utilized | 19[3] | 20[3] | 23[4] | 24[4] | 25[4] | 26[4] |
| Cream Time (sec) | 24 | 24 | 26 | 28 | 29 | 28 |
| Gel Time (sec) | 73 | 65 | 63 | 64 | 61 | 63 |
| Firm Time (sec) | 80 | 80 | 91 | 86 | 89 | 95 |
| Tack Free Time (sec) | 115 | 110 | 115 | 120 | 125 | 125 |
| Density (pcf) | 2.03 | 2.00 | 2.00 | 2.05 | 2.03 | 2.01 |
| k-factor[1] after | | | | | | |
| 1 day | .131 | .128 | .128 | .129 | .131 | .130 |
| 30 days | .148 | .146 | .146 | .147 | .147 | .149 |
| %Δ V max[2], after | | | | | | |
| 28 days at 70° C./95% R.H. | 18.9 | 20.6 | 33.3 | 31.1 | 27.0 | 24.6 |

TABLE X-continued
EVALUATION OF POLYOLS IN POLYURETHANE FOAMS

| | FOAM | | | | | |
|---|---|---|---|---|---|---|
| | A | B | C | D | E | F |
| 28 days at 110° C. | 20.3 | 23.9 | 36.2 | 32.7 | 27.1 | 26.6 |

[1]Units = Btu-in/hr-ft²-°F.
[2]According to ASTM Test Method D-2126.
[3]Of Example 9.
[4]Of Example 10.

EXAMPLE 12

This example illustrates the preparation of aromatic polyester polyols by transesterifying a DMT process residue with (a) Polyether Polyol No. 2 of the invention and (b) three comparative polyols.

The preparation of inventive Polyester Polyol No. 29 and comparative Polyester Polyols D–F of Table XI below was initiated by placing the listed quantities of the ingredients in a resin kettle equipped with a stirrer, thermometer and distillation head. The ingredients were brought to 225° C. and held at this temperature for 2 hours, during which time methanol and water were distilled from the reaction mixture. Each transesterified product then was stripped on a Pope thin film distillation apparatus to yield a polyester polyol having the equivalent weight and viscosity shown in the table.

The Table XI results demonstrate the surprisingly low viscosity of the polyester polyol of the invention. The viscosity of Polyol No. 29 is much lower than that of polyols of similar equivalent weight made with either diethylene glycol, dipropylene glycol or mixtures of the two.

TABLE XI
TRANSESTERIFIED POLYOL MIXTURES

| | POLYESTER POLYOL | | | |
|---|---|---|---|---|
| | No. 29 | D | E | F |
| Charge | | | | |
| DMT Process Residue III[1] (g) | 320 | 400 | 315 | 315 |
| Polyether Polyol No. 2[2] (g) | 618 | — | — | — |
| Diethylene Glycol (g) | — | 640 | — | 277 |
| Dipropylene Glycol (g) | — | — | 635 | 287 |
| Catalyst[3] | Mn | Mn | Mn | Mn |
| Catalyst (g) | 2 | 2 | 2 | 2 |
| Properties | | | | |
| Brookfield Viscosity (cps) | 4,600 | 8,200 | 14,640 | 6,900 |
| Equivalent Wt. | 176 | 180 | 195 | 171 |
| Solubility of R-11B (%) | ca. 33 | 15 | ≧30 | 21.5 |

[1]Residue III has an acid number of 64.4, saponification number of 484.5, DMT content of 11.9% and higher biphenyl diester-biphenyl triester ratio than Residue I of Example 4.
[2]Of Example 2.
[3]Mn = Mn(OAC)₂·4H₂O.

I claim:

1. In a polyester polyol composition suitable for use in a foam-forming reaction with an organic polyisocyanate in the manufacture of a polyurethane or polyisocyanurate foam and characterized by a hydroxyl number of from about 150 to about 950 and a Brookfield viscosity at 25° C. of from about 500 to about 500,000 cps, the polyester polyol being the reaction product of polycarboxylic acid and polyol components, the improvement wherein the polyol component solely or partially comprises and oxyalkylated polyol selected from the group consisting of
    (a) at least one oxyalkylated polyol having at least one primary and at least one secondary hydroxyl group, and
    (b) an oxyalkylated polyol mixture containing at least one oxyalkylated polyol having at least one primary and at least one secondary hydroxyl group.

2. The composition of claim 1 comprising an aromatic polyester polyol having a hydroxyl number of from about 230 to about 650 and an average functionality of about 1.8 to about 5.

3. The composition of claim 1 comprising the reaction product of at least one member selected from the group consisting of (a) ester-containing by-products from the manufacture of dimethyl terephthalate, (b) scrap polyalkylene terephthalates, (c) phthalic anhydride, (d) residues from the manufacture of phthalic anhydride, (e) terephthalic acid, (f) residues from the manufacture of terephthalic acid, (g) isophthalic acid and (h) trimellitic anhydride, and the polyol component.

4. The composition of claim 3 which includes as an additional reactant a functionality-enhancing additive selected from the group consisting of glycerol, pentaerythritol, α-methylglucoside, sucrose, sorbitol, trimethylolpropane, and mixtures thereof.

5. The composition of claim 1 wherein the oxyalkylated polyol is produced by the reaction of (i) at least one glycol selected from the group consisting of an alkylene glycol, an oxyalkylene glycol, and mixtures thereof and (ii) at least one alkylene oxide having the formula

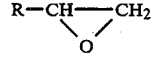

wherein R is a member selected from the group consisting of hydrogen and lower alkyl of one to four carbon atoms.

6. The composition of claim 5 wherein glycol (i) is a member selected from the group consisting of ethylene glycol, propylene glycol, diethylene glycol, dipropylene glycol, and mixtures thereof, and alkylene oxide (ii) is a member selected from the group consisting of ethylene oxide, propylene oxide and mixtures thereof.

7. The composition of claim 1 wherein the polyol component comprises about 100% by weight of oxyalkylated polyol mixture (b).

8. The composition of claim 7 wherein oxyalkylated polyol mixture (b) comprises the reaction product of (i) at least one glycol selected from the group consisting of an alkylene glycol, an oxalkylene glycol, and mixtures thereof and (ii) at least one alkylene oxide having the formula

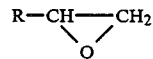

wherein R is a member selected from the group consisting of hydrogen and lower alkyl of one to four carbon atoms.

9. The composition of claim 8 comprising an aromatic polyester polyol having a hydroxyl number of from about 230 to about 650 and an average functionality of about 2 to about 2.5.

10. The composition of claim 9 comprising the polyester polyol prepared by the transesterification of (a) a residue remaining after dimethyl terephthalate and methyl p-toluate have been removed from the product of oxidation of p-xylene in the preparation of dimethyl terephthalate with (b) oxyalkylated polyol mixture (b) as the transesterifying polyol.

11. The composition of claim 10 wherein residue (a) is the residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids.

12. The composition of claim 8 wherein glycol (i) is a member selected from the group consisting of ethylene glycol, diethylene glycol and mixtures thereof, alkylene oxide (ii) is propylene oxide, and the polyester polyol is characterized by a viscosity in cps at 25° C. of about 2,000 to about 50,000, a free glycol content of from about 10 to about 22 percent by weight of the polyester polyol, a hydroxyl number within a range of from about 275 to about 400, and an acid number of about 0.2 to about 10.

13. The composition of claim 12 comprising the polyester polyol prepared by the transesterification of (a) residue remaining after dimethyl terephthalate and methyl p-toluate have been removed from the product of oxidation of p-xylene in the preparation of dimethyl terephthalate with (b) oxyalkylated polyol mixture (b) as the transesterifying polyol.

14. A blend comprising a fluorocarbon blowing agent and the polyester polyol of claim 1.

15. A blend comprising a fluorocarbon blowing agent and the polyester polyol of claim 7.

16. In a process for the production of the polyester polyol of claim 1 by reacting polycarboxylic acid and polyol components, the improvement wherein the polyol component solely or partially comprises an oxyalkylated polyol selected from the group consisting of
 (a) at least one oxyalkylated polyol having at least one primary and at least one secondary hydroxyl group, and
 (b) an oxyalkylated polyol mixture containing at least one oxyalkylated polyol having at least one primary and at least one secondary hydroxyl group.

17. In a process for the production of a polyisocyanurate foam comprising the reaction product of an organic polyisocyanate, a blowing agent, a trimerization catalyst, and a minor amount of a polyol, the improvement wherein from about 5 to 100 weight percent of the polyol comprises the polyester polyol of claim 1.

18. In a process for the production of a polyurethane foam comprising the reaction product of an organic polyisocyanate, a blowing agent, a catalyst and a polyol, the improvement wherein from about 5 to 100 weight percent of the polyol comprises the polyester polyol of claim 1.

19. In a process for the production of a laminate of a polyisocyanurate foam in which at least one facing sheet is contacted with a polyisocyanurate foam-forming mixture comprising an organic polyisocyanate, a blowing agent, a trimerization catalyst, and a minor amount of a polyol, and the foam-forming mixture is allowed to foam, the improvement wherein from about 5 to 100 weight percent of the polyol comprises the polyester polyol of claim 1.

20. In a process for the production of a laminate of a polyurethane foam in which at least one facing sheet is contacted with a polyurethane foam-forming mixture comprising an organic polyisocyanate, a blowing agent, a catalyst and a polyol, and the foam-forming mixture is allowed to foam, the improvement wherein from about 5 to 100 weight percent of the polyol comprises the polyester polyol of claim 1.

* * * * *